(12) United States Patent
Lauenstein (10) Patent No.: US 12,161,148 B2
(45) Date of Patent: Dec. 10, 2024

(54) METHOD FOR THE PRODUCTION OF A SHEET OF MATERIAL CONTAINING ALKALOIDS

(71) Applicant: PHILIP MORRIS PRODUCTS S.A., Neuchatel (CH)

(72) Inventor: Stefan Lauenstein, Cormondreche (CH)

(73) Assignee: Philip Morris Products S.A., Neuchatel (CH)

( * ) Notice: Subject to any disclaimer, the term of this patent is extended or adjusted under 35 U.S.C. 154(b) by 783 days.

(21) Appl. No.: 17/312,102

(22) PCT Filed: Dec. 18, 2019

(86) PCT No.: PCT/EP2019/086094
§ 371 (c)(1),
(2) Date: Jun. 9, 2021

(87) PCT Pub. No.: WO2020/127584
PCT Pub. Date: Jun. 25, 2020

(65) Prior Publication Data
US 2022/0022518 A1    Jan. 27, 2022

(30) Foreign Application Priority Data
Dec. 18, 2018   (EP) .................................. 18213641

(51) Int. Cl.
*A24B 3/14* (2006.01)
*A24B 15/24* (2006.01)

(52) U.S. Cl.
CPC ................ *A24B 3/14* (2013.01); *A24B 15/24* (2013.01)

(58) Field of Classification Search
CPC .................................. A24B 3/14; A24B 15/24
See application file for complete search history.

(56) References Cited

U.S. PATENT DOCUMENTS 3,589,032 A    6/1971  Gretz
4,306,358 A *  12/1981  King, Jr. ................... F26B 3/22
                                                              34/23

(Continued)

FOREIGN PATENT DOCUMENTS

EP           0565360        6/2000
WO    WO 2016/096964        6/2016

OTHER PUBLICATIONS

PCT Search Report and Written Opinion for PCT/EP2019/086094 dated Mar. 13, 2020 (15 pages).

(Continued)

*Primary Examiner* — Christopher M Rodd
*Assistant Examiner* — Ronnie Kirby Jordan
(74) *Attorney, Agent, or Firm* — Mueting Raasch Group (57) ABSTRACT

The present invention relates to a method to produce a sheet of a material containing alkaloids, the method comprising:—mixing particles of the material containing alkaloids, a binder, an aerosol former and water to form a slurry;—casting (100) the slurry to form a cast sheet;—drying (101) the cast sheet by means of a heated fluid;—recovering heat (103) from exhausts produced during drying;—recovering volatile substances from exhausts produced during drying; and—obtaining a flavor extract from the recovered volatile substances.

13 Claims, 5 Drawing Sheets

(56) References Cited

U.S. PATENT DOCUMENTS

| | | | |
|---|---|---|---|
| 4,306,578 A * | 12/1981 | Schmidt et al. ......... | A24B 3/14 |
| | | | 131/353 |
| 4,346,524 A | 8/1982 | Wochnowski | |
| 4,674,519 A | 6/1987 | Keritsis | |
| 5,159,942 A | 11/1992 | Brinkley | |
| 2008/0199574 A1 * | 8/2008 | Iodice et al. ............. | A24B 3/14 |
| | | | 426/285 |
| 2008/0216854 A1 * | 9/2008 | Nicholls et al. ......... | A24B 3/14 |
| | | | 131/372 |

OTHER PUBLICATIONS

Arsenyeva et al, "Utilisation of Waste heat from Exhaust Gases of Drying Process", *Frontiers of Chemical Science and Engineering*, Higher Education Press, Heidelberg, vol. 10, No. 1, Feb. 20, 2016, pp. 131-138.

* cited by examiner

METHOD FOR THE PRODUCTION OF A SHEET OF MATERIAL CONTAINING ALKALOIDS

This application is a U.S. National Stage Application of International Application No. PCT/EP2019/086094 filed Dec. 18, 2019, which was published in English on Jun. 25, 2020, as International Publication No. WO 2020/127584 A1. International Application No. PCT/EP2019/086094 claims priority to European Application No. 18213641.6 filed Dec. 18, 2018.

This invention relates to a method for producing a sheet of material containing alkaloids. In particular, the invention relates to a method for producing a sheet of material for use in an aerosol-generating article such as, for example, a cigarette or a "heat-not-burn" type alkaloids containing product.

Today, in the manufacture of tobacco products, besides tobacco leaves, also homogenized tobacco material is used. This homogenized tobacco material is typically manufactured from parts of the tobacco plant that are less suited for the production of cut filler, like, for example, tobacco stems or tobacco dust. Typically, tobacco dust is created as a side product during the handling of the tobacco leaves during manufacture.

The most commonly used forms of homogenized tobacco material are reconstituted tobacco sheet and cast leaf. The process to form homogenized tobacco material sheets commonly comprises a step in which tobacco dust and a binder, are mixed to form a slurry. The slurry is then used to create a tobacco web, for example by casting a viscous slurry onto a moving metal belt to produce so called cast leaf. Alternatively, a slurry with low viscosity and high water content can be used to create reconstituted tobacco in a process that resembles paper-making. Once prepared, homogenized tobacco webs may be cut in a similar fashion as whole leaf tobacco to produce tobacco cut filler suitable for cigarettes and other smoking articles. A process for making such homogenized tobacco is for example disclosed in European Patent EP 0565360.

In the aforementioned process, the slurry is cast on a substrate, such as a moving belt, and then it is heated in order to obtain a sheet of material which can be further processed to obtain components for an aerosol generating article. The moving belt, with the cast sheet on it, moves inside long "dryers" where the temperature is controlled to progressively heat and dry the sheet. To dry the cast sheet, the dryers usually eject streams of hot air toward the top surface of the sheet and eject steam toward the bottom surface of the steel belt to heat the latter. Slurry deposited on the belt enters in the dryers in a substantially liquid form, is dried and heated up inside the dryers and exits in a substantially solid form as a continuous cast sheet.

The drying process above described requires a high quantity of energy to heat and dry the sheet. Part of this heat is effectively transferred to the sheet and dries it (latent heat of evaporation). Some additional heat remains in the hot dry air and in the steam when they are expelled via the dryers' exhausts, or it stays in the heated moving metal belt after the sheet has been removed from it.

Furthermore, during this drying process, some of the flavors and alkaloids present in the sheet are trapped by the evaporating water, and then carried away by the vapor from the drying sheet.

It would be desirable to increase the efficiency of the drying stage. There is therefore a need for a new method of preparing a sheet of material containing alkaloids, preferably but not necessarily for the use in a heated aerosol-generating article of the "heat-not-burn" type, that is adapted to the above described heating characteristics of the drying process.

The invention relates to a method to produce a sheet of a material containing alkaloids, the method comprising: mixing particles of the material containing alkaloids, a binder, an aerosol former and water to form a slurry; casting the slurry to form a cast sheet; drying the cast sheet by means of a heated fluid; and recovering heat from exhausts produced during drying.

The slurry containing a material including alkaloids is cast, for example on a support. The resulting cast sheet is dried in a dryer using a heated fluid, which exchanges heat with the cast sheet. The heated fluid may heat and dry the sheet. During this drying process, exhausts are produced. According to the invention, the exhausts are collected and heat is recovered from them. In this way, the heat which would have been wasted in the exhausts can be reused, for example in the same process of production of the sheet.

As used herein, the terms "sheet" denotes a laminar element having a width and length substantially greater than the thickness thereof. The width of the sheet of material containing alkaloids is preferably greater than about 10 millimeters, more preferably greater than about 20 millimeters or about 30 millimeters. Even more preferably, the width of the sheet of material containing alkaloids is comprised between about 60 millimeters and about 2500 millimeters. The thickness of the sheet of material containing alkaloids is preferably comprised between about 50 micrometers and about 300 micrometers, more preferably the thickness of the sheet is comprised between about 100 micrometers and about 250 micrometers, even more preferably between about 130 micrometers and 220 micrometers. A continuous "sheet" is herein called "web".

As used herein, the term "casting blade" denotes a longitudinally shaped element that may have an essentially constant cross-section along major parts of its lengthwise extension. It shows at least one edge that is intended to come into contact with a pasty, viscous or liquid-like substance to be influenced by said edge, such as a slurry. Said edge may have a sharp and knife-like edge. Alternatively, it may have a rectangular or a rounded edge.

As used herein, the term "movable support" denotes any means comprising a surface that can be moved in at least one longitudinal direction. The movable support may form a closed loop so as to provide an uninterrupted transport in one direction. The movable support may include a conveyor belt. The movable support may be essentially flat and may show a structured or an unstructured surface. The movable support may have no openings on its surface or may include orifices, preferably of such a size that they are impenetrable for the slurry deposited on it. The movable support may comprise a sheet-like movable and bendable band. The band may be made of a metallic material, including but not limited to steel, copper, iron alloys and copper alloys, or of a rubber material. The band may be made of a temperature-resistant material so that it can be heated to speed up the drying process of the slurry.

As used herein, the term "slurry" denotes a liquid-like, viscous or pasty material that may comprise an emulsion of different liquid-like, viscous or pasty material and that may contain a certain amount of solid-state particles, provided that the slurry still shows a liquid-like, viscous or pasty behavior.

A "material containing alkaloids" is a material which contains one or more alkaloids. The alkaloids may comprise nicotine. The nicotine may be found, for example, in tobacco.

Alkaloids are a group of naturally occurring chemical compounds that mostly contain basic nitrogen atoms. This group also includes some related compounds with neutral and even weakly acidic properties. Some synthetic compounds of similar structure are also termed alkaloids. In addition to carbon, hydrogen and nitrogen, alkaloids may also contain oxygen, sulfur and, more rarely, other elements such as chlorine, bromine, and phosphorus.

Alkaloids are produced by a large variety of organisms including bacteria, fungi, plants, and animals. They can be purified from crude extracts of these organisms by acid-base extraction. Caffeine, nicotine, theobromine, atropine, tubocurarine are examples of alkaloids.

Preferably, the material containing alkaloids includes a homogenized tobacco material. In this case therefore the alkaloid is nicotine. As used herein, the term "homogenised tobacco material" denotes material formed by agglomerating particulate tobacco, which contains the alkaloid nicotine.

The most commonly used forms of homogenized tobacco material is reconstituted tobacco sheet and cast leaf. The process to form homogenized tobacco material sheets commonly comprises a step in which tobacco dust and a binder, are mixed to form a slurry. The slurry is then used to create a tobacco web. For example by casting a viscous slurry onto a moving metal belt to produce so called cast leaf. Alternatively, a slurry with low viscosity and high water content can be used to create reconstituted tobacco in a process that resembles paper-making.

The sheet material of tobacco can be referred to as a reconstituted sheet material and formed using particulate tobacco (for example, reconstituted tobacco) or a tobacco particulate blend, a humectant and an aqueous solvent to form the tobacco composition. This tobacco composition may be then casted, extruded, rolled or pressed to form a sheet material from the tobacco composition. The sheet of tobacco can be formed utilizing a wet process, where tobacco fines are used to make a paper-like material; or a cast leaf process, where tobacco fines are mixed together with a binder material and cast onto a moving belt to form a sheet.

The homogenized tobacco sheet generally preferably includes, in addition to the tobacco, a binder. The homogenized tobacco sheet generally preferably includes an aerosol-former, such as guar and glycerin.

The term "aerosol-forming substrate" refers to a substrate that is capable of releasing volatile compounds that may form an aerosol. Typically, aerosol-forming substrates release volatile compounds upon heating. The aerosol-forming substrate may include the material containing alkaloids containing volatile alkaloids flavor compounds, which are released from the aerosol-forming substrate upon heating. The aerosol-forming substrate may include homogenized material.

In order to form a sheet of material containing alkaloids, a slurry is formed.

The slurry may comprise a number of different components or ingredients. These components may influence the properties of the cast sheet of material containing alkaloids. A first ingredient is a material containing alkaloids, for example in powder form. This material can be for example a tobacco powder blend, which preferably contains the majority of the tobacco present in the slurry. The tobacco powder blend is the source of the majority of tobacco in the homogenized tobacco material and thus gives the flavour to the final product, for example to an aerosol produced by heating the homogenized tobacco material.

Preferably, the powder of material containing alkaloids has a size of between about 0.03 millimetres and about 0.12 millimetres. With size of the particle or powder of the material containing alkaloids, the Dv95 size is meant. Each of the values above listed indicates the Dv95 of the particle size. The "v" in Dv95 means that a volume distribution is considered. The use of volume distributions introduces the concept of the equivalent sphere. An equivalent sphere is a sphere which is equal to the real particle in the property which we are measuring. Thus for light scattering methods, it is a sphere which would produce the same scattering intensities as the real particle. This is substantially a sphere having the same volume of the particle. Further, "95" in Dv95 means the diameter where ninety-five percent of the distribution has a smaller particle size and five percent has a larger particle size. Thus the particle size is that size according to a volume distribution where 95 percent of the particles have a diameter (of the corresponding sphere having substantially the same volume of the particle) smaller than the stated value. A particle size of 60 microns means that 95 percent of the particles have a diameter smaller than 60 microns, where the diameter is the diameter of the sphere having a corresponding volume than the particle.

The Dv95 size of the particle is measured using a Horiba LA 950 or LA 960 particle size distribution analyser. The HORIBA LA-960 particle size analyser uses the laser diffraction method to measure size distributions. This technique uses first principles to calculate size using light scattered off the particle (edge diffraction) and through the particle (secondary scattering refraction). The LA-960 incorporates the Mie scattering theory.

A binder may be added to the slurry in order to enhance the tensile properties of the homogenized sheet. An aerosol-former may be added to the slurry, to promote the formation of aerosol. Further, in order to reach a certain viscosity and moisture optimal for casting the web of material containing alkaloids, water may be added to the slurry.

The quantity of binder added to the slurry may be comprised between about 1 percent and about 5 percent in dry weight of the slurry. More preferably, it is comprised between about 2 percent and about 4 percent. The binder used in the slurry may be any of the gums or pectins described herein. The binder may ensure that the powder of material containing alkaloids, such as tobacco, remains substantially dispersed throughout the homogenized tobacco web. Although any binder may be employed, preferred binders are natural pectins, such as fruit, citrus or tobacco pectins; guar gums, such as hydroxyethyl guar and hydroxypropyl guar; locust bean gums, such as hydroxyethyl and hydroxypropyl locust bean gum; alginate; starches, such as modified or derivitized starches; celluloses, such as methyl, ethyl, ethylhydroxymethyl and carboxymethyl cellulose; tamarind gum; dextran; pullalon; konjac flour; xanthan gum and the like. The particularly preferred binder for use in the present invention is guar.

Suitable aerosol-formers for inclusion in slurry for material containing alkaloids are known in the art and include, but are not limited to: monohydric alcohols like menthol, polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate.

Examples of preferred aerosol-formers are glycerine and propylene glycol.

The slurry may have an aerosol-former content of greater than about 5 percent on a dry weight basis. The slurry may have an aerosol former content of between about 5 percent and about 30 percent by weight on a dry weight basis. More preferably, the aerosol-former is comprised between about 10 percent to about 25 percent of dry weight of the slurry. More preferably, the aerosol-former is comprised between about 15 percent to about 25 percent of dry weight of the slurry.

A cellulose pulp containing cellulose fibres is preferably added to the slurry in order to increase the tensile strength of the alkaloids material web, acting as a strengthening agent.

The introduction of cellulose fibres in the slurry typically increases the tensile strength of the tobacco material web, acting as a strengthening agent. Therefore, adding cellulose fibres may increase the resilience of the homogenized tobacco material web. Cellulose fibres for including in a slurry for homogenized tobacco material are known in the art and include, but are not limited to: soft-wood fibres, hard wood fibres, jute fibres, flax fibres, tobacco fibres and combination thereof. In addition to pulping, the cellulose fibres might be subjected to suitable processes such as refining, mechanical pulping, chemical pulping, bleaching, sulphate pulping and combination thereof. Cellulose fibres may include tobacco stem materials, stalks or other tobacco plant material. Preferably, cellulose fibres such as wood fibres comprise a low lignin content. Alternatively, fibres, such as vegetable fibres, may be used either with the above fibres or in the alternative, including hemp and bamboo. The length of cellulose fibres is advantageously between about 0.2 millimetres and about 4 millimetres. Preferably, the mean length per weight of the cellulose fibres is between about 1 millimetre and about 3 millimetres. Further, preferably, the amount of the cellulose fibres is comprised between about 1 percent and about 7 percent in dry weight basis of the total weight of the slurry (or homogenized tobacco sheet).

The mean length of the fibers refers to their real length (regardless whether they are curled or have kinks) as measured by MORFI COMPACT commercialised by Techpap SAS. The mean length is the mathematical mean of the measured length of the fibers by MORFI COMPACT over a measurement of N fibers, where N>5. The MORFI COMPACT is a fiber analyser that measures the length of the fibers following the framework of the fibers, thus measuring their real developed length. Measured objects are considered fibers if their length is comprised between 200 microns and 10000 microns and their width is comprised between 5 microns and 75 microns. Fibers length is measured when deionized water is added to the fibers and Morfi software is used.

Preferably, the moisture of said slurry at casting is between about 60 percent and about 80 percent of the total weight of the tobacco material at casting. Preferably, the amount of water in the slurry is comprised between about 60 percent and 80 percent of the total mass of the slurry at casting.

The binder and the cellulose fibres are preferably included in a weight ratio comprised between about 1:7 and about 5:1. More preferably, the binder and the cellulose fibres are included in a weight ratio comprised between about 1:1 and about 3:1.

The binder and the aerosol-former are preferably included in a weight ratio comprised between about 1:30 and about 1:1. More preferably, the binder and the aerosol-former are included in a weight ratio comprised between about 1:20 and about 1:4.

Preferably, the alkaloid containing material is tobacco. The binder and the tobacco particles are preferably included in a weight ratio comprised between about 1:100 and about 1:10. More preferably, the binder and the tobacco particles are included in a weight ratio comprised between about 1:50 and about 1:15, even more preferably between about 1:30 and 1:20.

The aerosol-former and the tobacco particles are preferably included in a weight ratio comprised between about 1:20 and about 1:1. More preferably, the aerosol-former and the tobacco particles are included in a weight ratio comprised between about 1:6 and about 1:2.

The aerosol former and the cellulose fibres are preferably included in a weight ratio comprised between about 1:1 and about 30:1. More preferably, the aerosol-former and the cellulose fibres are included in a weight ratio comprised between about 5:1 and about 15:1.

The cellulose fibres and the tobacco particles are preferably included in a weight ratio comprised between about 1:100 and about 1:10. More preferably, the cellulose fibres and the tobacco particles are preferably included in a weight ratio comprised between about 1:50 and about 1:20.

The slurry formed with some or all the ingredients above described may be for example contained in a casting box. The slurry may reach the casting box from a different location. The casting box therefore might not be the place where the slurry is formed. For example, the slurry may be created in a silo, from where it is transferred to the casting box via suitable piping.

The slurry inside the casting box is preferably kept at about ambient temperature, that is, between about 15 degrees Celsius and about 30 degrees Celsius. From the casting box, the slurry is cast in order to form a sheet. Preferably, the sheet is cast onto a movable support, for example a conveyor belt.

Preferably, the slurry is continuously supplied to the casting box while the slurry is cast onto the movable support to form a continuous web of material containing alkaloids. The silo and the casting box are thus preferably fluidly connected in order to allow the slurry flow from one to the other.

In this way, preferably a pre-defined amount of slurry is maintained in the casting box. Preferably, slurry is continuously supplied to the casting box while the slurry is cast onto a movable support by means of a casting blade to form a continuous web of material containing alkaloids. However, other casting systems, for example rollers, could also be used to cast the sheet of material containing alkaloids.

The casting-box is preferably box-shaped. Preferably, the casting box includes walls. More preferably, the walls in turn comprise sidewalls. The sidewalls may include a first and a second couple of opposite walls, called first, second, third and fourth sidewall. The sidewalls are advantageously substantially vertical, or tilted with respect to a vertical plane. First and second sidewall, and third and fourth sidewall, are one facing the other. Preferably, the walls of casting box also include a bottom wall which has an aperture. Preferably, the whole bottom wall defines an aperture.

The moving support preferably moves along a longitudinal direction in order to remove the slurry from the casting box. The support may include for example a stainless steel movable belt. The support is preferably moved by a drum which is adapted to advance the movable support. The drum is further adapted to be in thermal contact with the movable support for the cast web.

After casting, the cast sheet is dried to reduce its moisture content. The drying is used also to "harden" the sheet. In order to dry the cast sheet, a drying station, shortly "dryer", can be used.

In the drying station, preferably the temperature of the cast sheet is raised, so that moisture inside the cast sheet can decrease. Preferably, the moisture of said cast sheet at casting—that is, the moisture of the slurry—is between about 60 percent and about 80 percent of the total weight of the slurry. Preferably, the moisture of said cast sheet at the end of the drying is between about 7 percent and about 15 percent of total weight of the sheet of material containing alkaloids. Preferably, the moisture of said sheet of material containing alkaloids at the end of drying is between about 8 percent and about 12 percent of total weight of the sheet of material containing alkaloids. The moisture of the slurry at casting and at the end of the drying process is an important parameter to control as it influences the homogeneity of the sheet and the manufacturability of the sheet of material containing alkaloids in subsequent production steps.

It has been found, that the ideal level of moisture of the slurry is between about 60 percent and about 80 percent. Below this preferred range, the density of the slurry at casting is such that it frequently causes the appearance of defects in the cast web. Also, a moisture level outside of this range may result in a reduced tensile strength of the cast sheet that may complicate efficient handling of the sheet of material containing alkaloids in subsequent processing steps. Therefore, the excess moisture that needs to be removed during the drying step from the cast sheet is relatively high.

The removal of moisture is performed preferably by exposure to a stream of a heated fluid. For example, the heated fluid can be drying air, wherein the drying air has a higher temperature than the temperature of the cast sheet. Steam could be used as well.

Preferably, the dryer is divided in a plurality of drying sections along a drying line. The drying line is defined as the longitudinal direction along which the sheet moves within the dryer. A drying section downstream another drying section means a section that comes downstream another along the moving direction of the sheet. Preferably, more than a drying section is present. Preferably, each of the drying sections is independently controlled, so that in each drying section process parameters can be set independently from the other sections. Preferably, at least the first drying section includes first and second temperature control means which in turn include a hot air generator and a steam generator adapted to eject hot air and steam, respectively, towards the first and the second surface of the movable support. The steam is then directed to the support itself, while the hot air is directed toward the free surface of the cast sheet cast into the movable support. Advantageously, the flow rate of the ejected stream and of the hot air can be measured and regulated. Preferably, superheated steam is used to reduce the moisture of the cast web.

The heated fluid is preferably hot air, steam or superheated steam. The heated fluid can be any combination of hot air, steam and superheated steam For example, hot air and steam can be used together.

Further, preferably a continuous feedback control is present, so that flow rate or temperature or both of the drying air ejected from the drying air generator and of the steam ejected by the steam generator can be modified depending on the value of temperature and moisture of the cast sheet in the drying section(s).

The dryer is preferably a substantially closed environment. The heated fluid heats and/or dries the cast sheet introduced in the dryer. In this heating and/or drying process, the heated fluid may extract or remove from the sheet not only humidity, but also some components, such as volatiles, for example flavor or alkaloids.

The resulting exhausts produced inside the dryer are preferably collected or gathered. The exhausts may be in form of fluids, such as gasses and vapors, or liquids.

The invention proposes to recover the waste heat of the dryer, and in particular the waste heat present in the gathered or collected exhausts. Any known means to recover heat from exhausts can be used in the present invention.

The heat recovery according to the invention could be achieved by recovering heat coming from the dryers' exhausts, which can be collected from several locations around or along the dryer. Some exhausts may be coming from the upper portion, where with "upper portion" the portion of the dryer above the cast sheet is indicated. The exhausts recovered from the upper portion may be mixed with vapor and volatiles coming from the sheet.

Some exhausts coming from the bottom part of the dryer, where with "lower portion" the portion of the dryer below the cast sheet is indicated, can be gathered as well as heat can be recovered from them too. The exhausts recovered from the lower portion may be mainly liquids due to the vapor condensation.

Due to the different compositions of these exhausts, preferably a separated process for heat recovery for each different exhausts' type is performed.

The recovered heat can be reused in the casting and/or drying process. Preferably, the recovered heat is used within the apparatus to produce the sheet of material containing alkaloids. In this way, the efficiency of the production of the sheet of material including alkaloids is increased.

Further, the process does not change the dryer's construction substantially. Generally, exhausts are collected in order to avoid to release of chemical/dust compounds outside the plants. Therefore, the method of the invention does not require expensive additions of components to the existing dryers.

Furthermore, as the composition of the exhausts, in particular of those collected from the upper portion of the dryer, can vary along the drying line due to the change of composition of the volatiles coming from the sheet which is progressively drying, the collecting of the exhausts preferably takes place in different zones along the drying line.

Preferably, the method includes: recovering volatile substances from exhausts produced during drying; and obtaining a flavor extract from the recovered volatile substances. In the already collected exhausts, also volatiles coming from the sheet of material containing alkaloids are present. These volatiles can be also recovered and reused.

More preferably, the step of recovering volatile substances from exhausts produced in the drying step includes one or more of the following:
condensing the exhausts;
filtering the exhausts;
performing a liquid-liquid separation of the exhausts;
distilling the exhausts.

In particular, filtering just after condensation of the exhausts may be useful to remove possible dust inside the exhausts. In case of liquid-liquid separation, then preferably also a concentration step follows. The same concentration step may also follow the distillation step: The distillation step which is used to isolate specific compounds of the exhausts.

More preferably, the method includes: adding the flavor extract to the slurry. The recovered volatiles can be used again in the formation of a sheet of material containing alkaloids. The volatiles can be used to enhance a flavor of the sheet or to increase the concentration of some components of the sheet, for example of the contained alkaloids. Preferably, the flavor extracted is reintroduced in the slurry.

Preferably, the method includes using the recovered heat to warm up the slurry before casting. Preferably, the recovered heat is used in the casting and/or drying steps so that the overall process to produce a sheet of material containing alkaloids is more efficient. For example, the recovered heat can be used to warm up the slurry, for example the slurry contained in the casting box. The heat could be recovered by heat recovery mechanisms known in the art. Examples can be tube heat exchangers, heat pump (for the case where the temperature of the material whose heat is recovered is lower than the one at the designed area where it will be used) or pipe(s) driving the exhausts from a zone of the drying line to another.

Such preheating of the slurry by the recovered heat helps rendering the slurry more liquid, because slurry viscosity lowers with higher temperature, and so it helps the mixing and/or casting of the slurry.

Preferably, the method includes using the recovered heat to warm up the cast sheet at a given location. More preferably, the method includes: using the recovered heat to warm up the cast sheet in a location upstream the location in which the exhausts are recovered in the transport direction. To help dryers to heat the cast sheet and to decrease the need of energy to do so, the recovered heat can be used to heat up the sheet during the drying process. For example, the exhaust output from the dryer from a given location ejected at temperature T1 could be directed, via pipes, such as thermoconductor pipes running inside the dryers, toward portions of the dryer where the exhausts are ejected at a temperature lower than T1. Exhausts exiting a location at a lower temperature may indicate a lower inside temperature in that location of the dryer.

For instance, in case the drying line is progressively heating the cast sheet, that is, the temperature of the cast sheet increases while moving along the transport direction inside the dryer, then exhaust output of a zone could be transported upstream inside the dryer, in order to help heating the upstream zones of the dryer. The exhausts in this case are preferably simply transferred via suitable pipe(s) from one zone to another of the dryer.

The exhausts output of a bottom part zone of the dryer could be used to heat upper portion zones of the dryer. In the bottom part, generally the heated fluid is steam, and the steam used in the drying line is usually hotter than the hot dry air used in the upper portion of the dryer. The collected steam as exhausts can be used to help heat other bottom part zones, then can be directed in the upper portion of the dryers to help heating upper portion zones.

Preferably, the method includes: transporting the cast sheet along a transport direction during the drying; and collecting exhausts produced in the drying step from different locations along the transport direction. More preferably, the method also includes obtaining a different substance from the exhaust depending on the location of collection of the exhaust.

Separate collection points along the dryer line may be used to collect different fractions of exhausts containing different volatiles. The different volatiles may have different flavoring properties. Indeed, the composition of the cast sheet may change along the drying process, therefore, along the transport direction, the exhausts may not contain the same volatiles. As indicated, different treatments could be used (e.g. condensation, filtering, liquid-liquid separation, distillation, etc.) during such recovery and these treatments and/or the outputs of such treatments could be separated according to the zone of the drying line the exhausts and their volatiles are recovered.

Preferably, the method includes: casting the slurry onto a movable support; and recovering heat from the movable support.

Advantageously, the movable support includes an endless stainless steel conveyor belt. Stainless steel is a material which allows easy heat transfer as it is a good heat conductor. At the same time, a stainless steel belt reduces the risk of the cast sheet to firmly attach to the support and thus may allow a complete and continuous removal of the cast sheet from the movable support after the drying step. During the production process of the cast sheet, after the cast sheet has been at least partially dried, the cast sheet is removed from the movable support in order to be further processed. The cast sheet is then preferably further dried, cooled and then wound in bobbins. The endless movable support returns to the location of the casting box so that a further slurry can be cast onto the movable support. The removal of the cast sheet from the support preferably takes place by means of a blade called doctoring blade. In case the cast sheet is firmly "glued" onto the support, the action of the doctoring blade may cause a breakage of the cast web and a machine interruption. Therefore, it is preferred that the removal of the cast sheet from the support is as easy as possible. The use of stainless steel as the material for the support has been found to be a preferred solution. Also, stainless steel can be machined to the high required precision for the casting of the sheet. This makes stainless steel a cost efficient material as a movable support.

Due to the fact that the movable support is in contact to the cast sheet, heating up the cast sheet in the dryer implies to heat up also the movable support. It is preferred to recover and re-use also this heat, which would be otherwise wasted. Preferably, the heat from the movable support is recover after the drying step, i.e. outside the dryer. For example, some cooling water can be sent in close proximity to the movable support and the water heated up by the support can be reused to heat portions of the casting apparatus and/or dryer. This heat recovery system could be coupled to the existing cooling water piping already present on some production lines to cool the movable support.

This water heated by the movable support can be reused by sending it to a heat exchanger.

In a first embodiment, the heat recovery takes place while cleaning the movable support. After the movable support has exited the dryer, water is preferably used to clean it. For example, water can be sprayed on the surface of the movable support not in contact with the sheet. This water used to clean the movable support has generally a "cool" temperature, for example at about 12 degrees Celsius, and due to the contact with the movable support is heated up to a temperature above 20 degrees Celsius.

The cooling of the movable support by water can also lead to another advantage. First, the cooling water heats up and then is reused. Further, the cooling water may help to even out the temperature of the movable support when it returns to the casting stage. It is desired that at casting the movable support has a homogeneous temperature, because inhomogeneous temperature may cause inhomogeneity in the sheet during the drying, altering the product consistency and creating defects.

According to a preferred embodiment, the temperature of the movable support is regulated by means of a water cooling distributor. Preferably, the water is used to cool the movable support, for example cooling the drum(s) moving it, as the temperature of the support is generally higher than the desired temperature at casting, due to the fact that the support returns from the drying section, where the support and cast web are heated up to remove the moisture from the cast web. Water is a good and cost efficient means to maintain the temperature of an object, in this case the drum, controlled within a certain range due to the availability and high thermal capacity of water.

The cooling with water which is then heated and then reused can also be performed before winding the sheet up in bobbins. This cooling can also be performed by cool air, not only water. The heated up air then for example passes through a heat exchanger and it is then reused. Such heat recovery will also have several benefits, because a cooling before winding up the sheet decreases the tendency of the layers formed by the sheet to stick to each other once in the bobbin. Such "stickiness" of the layers is a current issue as it may create slowdown or even jam of the downstream machines.

Preferably, the method comprises: collecting water formed during the drying step; and recovering heat from the collected water. Preferably, in the dryer, the cast sheet is heated from below by steam generators. The steam can condense and form water in the lower part of the dryer. This heated water can be collected and the heat present therein can be recovered, for example transporting it in other location of the casting and/or drying apparatus.

Preferably, the method includes: using the recovered heat to separate the recovered volatile substances. To obtain the volatile substances from the exhausts, the heat recovered from the same exhausts can be used, for example for a distillation process. This embodiment shows a strong coupling between the waste heat recovery and the waste volatiles recovery.

Preferably, the step of recovering heat from exhausts produced in the drying step includes one or more of: recovering heat by means of a heat exchanger; recovering heat by means of a heat pump; or transporting exhausts by means of pipes. The heat present in the exhausts can be used for example to heat up water. The heated water may then flow in pipes and warm up other parts of the apparatus for the production of a sheet of a material containing alkaloids. Alternatively, the exhausts may flow through heat exchangers heating the fluid therein. The exhausts may be in form of liquid or gas.

Preferably, the cast sheet is dried in a dryer and the step of recovering heat from exhausts produced in the drying step includes recovering heat from exhausts produced in an upper portion of the dryer. The exhausts are preferably in gas form.

Preferably, the cast sheet is dried in a dryer and the step of recovering heat from exhausts produced in the drying step includes one or more of: collecting gaseous exhausts from an upper portion of the dryer; collecting liquid exhausts from a lower portion of the dryer.

Further advantages of the invention will become apparent from the detailed description thereof with no-limiting reference to the appended drawings.

Figure 1:
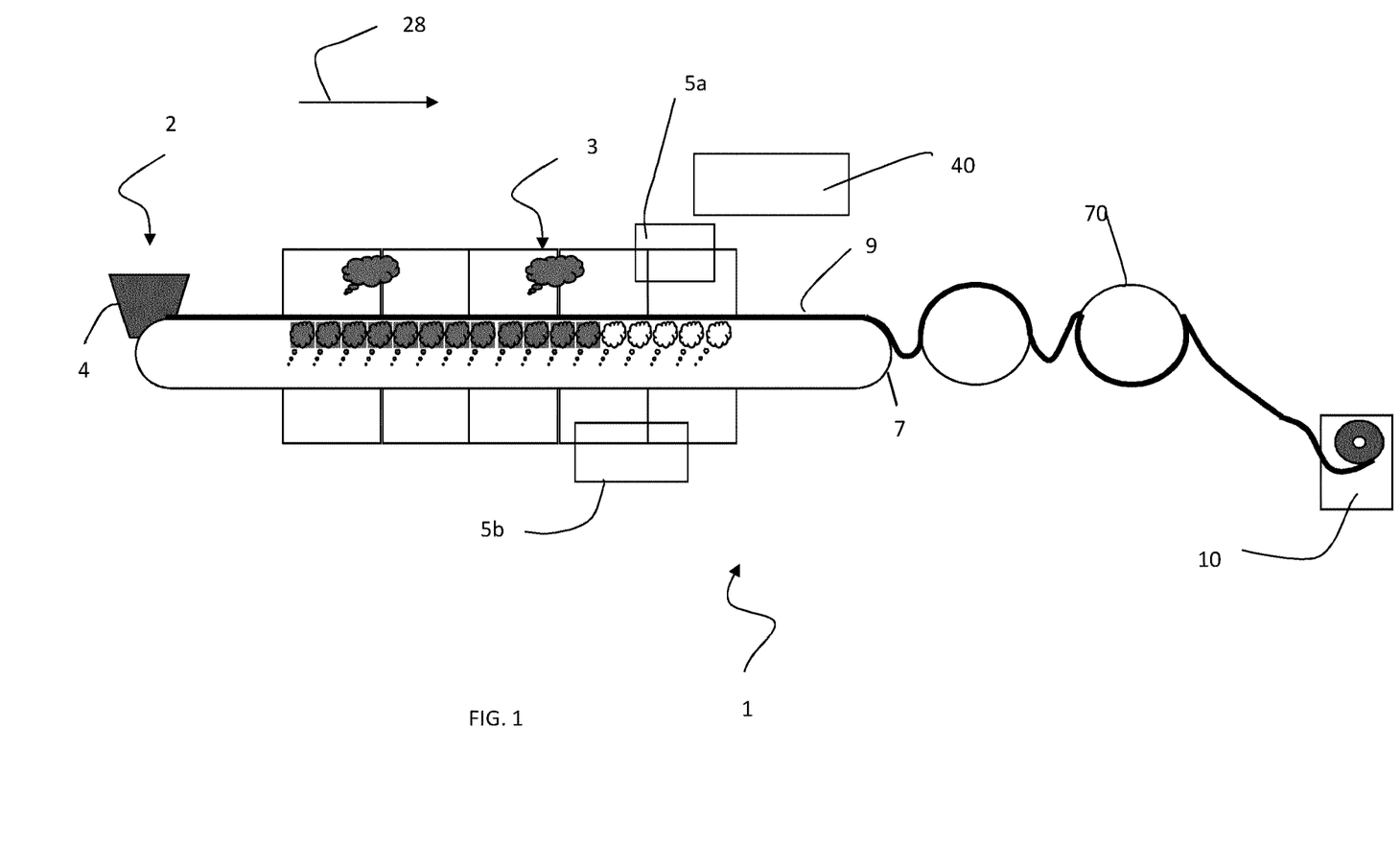
FIG. 1 is a schematic lateral view of an apparatus for the production of a homogenized tobacco web according to the invention.
Figure 2:
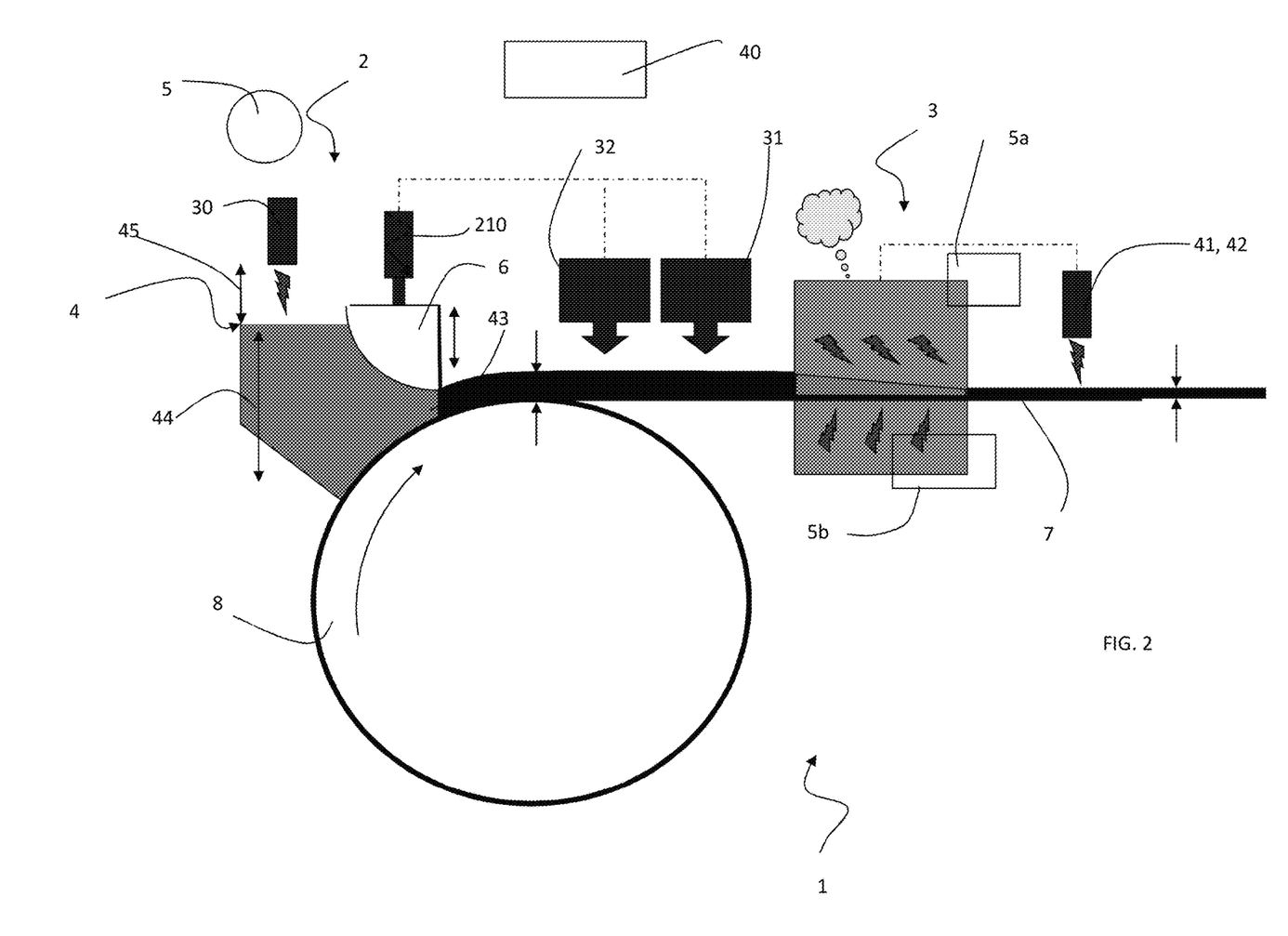
FIG. 2 is a schematic lateral view in section of a portion of the apparatus of FIG. 1.

With initial reference to FIGS. 1 and 2, an apparatus for the production of a sheet of material containing alkaloids 9, such as a homogenized tobacco material, according to the present invention, is represented and indicated with reference number 1.

The apparatus 1 for the production of the sheet includes a casting apparatus 2 and further also a drying apparatus 3 positioned downstream the casting apparatus 2 in the direction of motion of the sheet, indicated by an arrow 28. The apparatus 1 also comprises a winding station 10 downstream the drying apparatus 3.

The casting apparatus 2 comprises a casting box 4 where slurry to form the web of homogenized tobacco material is introduced, a pump 5, a casting blade 6 (see FIG. 2) and a first movable support 7. Casting box 4 may have any geometrical shape, and in the depicted embodiment it is substantially a prism. A temperature of the casting box can be varied in order to modify the temperature of the slurry, if needed, during the casting process, by means of a casting box control means (not shown in the appended drawings). The casting box 4 has an opening 43 in correspondence of its bottom and the opening extends along a width of the casting box, so that slurry can be cast from the casting box onto the movable support 7. Slurry from buffer tanks (not shown in the drawings) is transferred by means of the pump 5 into the casting box 4. Preferably pump 5 comprises a control (also not visible in the drawings) of flow rate to control the amount of slurry introduced in the casting box 4. Pump 5 is advantageously designed to ensure that slurry transfer times are kept to the minimum necessary.

Further, with reference to FIG. 2, the casting apparatus 2 includes the casting blade 6 fixed to the casting box 4 in order to cast the slurry. The casting blade 6 has a main dimension which is its width and it is fixed to the casting box 4 at or in proximity of its aperture 43 at the bottom.

The casting blade 6 is attached to the casting box 4 preferably by means of an adjustable board (not visible in the drawings) which allows a precise control of the position of the casting blade 6 to adjust a gap between the blade 6 and the support 7. The blade 6 can be moved in order to vary the dimension of the gap by means of actuators such as actuator 210 visible in FIG. 2.

The casting box 4 and the casting blade 6 are mounted above a drum 8 which rotates the movable support 7. Between the casting blade 6 and the movable support 7 the gap is present, the dimensions of which determine—among others—the thickness of the cast web of homogenized tobacco material.

The casting apparatus 2 also comprises the mobile support 7 on which the slurry is cast to form the web of homogenized tobacco material. The mobile support 7 comprises for example a continuous endless stainless steel belt 7 that is at least partially arranged around a drum assembly. The drum assembly includes a main drum 8 located below the casting box 4. The main drum 8 advances the movable support 7 by means of the rotation of the main drum 8. Preferably, the casting box 4 is mounted on top of the main drum 8.

Further, with again reference to FIG. 2, the casting apparatus 2 includes a plurality of sensors. A first sensor 30, a level sensor, is adapted to control the height 44 of the slurry within the casting box 4. This sensor 30 preferably measures a distance 45 between the sensor itself and the surface of the slurry in the casting box 4. The height 44 of the slurry is then derived from the known distance between the sensor 30 and the bottom of the casting box 4. Further, preferably a further sensor 32 is arranged above the movable support 7 to measure the weight per square centimeter of the homogenized tobacco layer on the movable support 7. The sensor 32 may be for example a nucleonic measuring head. Additional sensors are preferably present as well, such as a sensor 31 to locate and determine the positions of defects in the cast web of homogenized tobacco, a sensor (not shown in the drawings) to determine the moisture of the slurry and of the cast leaf at casting, and a temperature sensor (not shown in the drawings) for determining the temperature of the slurry in the casting box 4.

Preferably, one or more of sensors 30, 31, 32 send signals relative to their respective parameters to be measured (for example, temperature, moisture slurry level, presence and location of defects) to a central control unit 40. Central control unit 40 is preferably electrically connected to one, to some or to all of: pump 5, adjustable board or to further circuits and actuators in the casting apparatus 2 or in a slurry preparation apparatus (not visible). In case the cast sheet 9 reveals defects or inhomogeneity or the characteristics of the cast sheet are outside a preset range, the central control unit 40 can instruct changes in the process parameters and thus influence characteristics of the slurry or the parameters of the casting.

These process parameters may be for example the dimension of the gap between the casting blade 6 and the support 7 or the amount of slurry in the casting box. Further, a control of the speed of the drum 8, and thus of the support 7, can be implemented as well.

Figure 4:
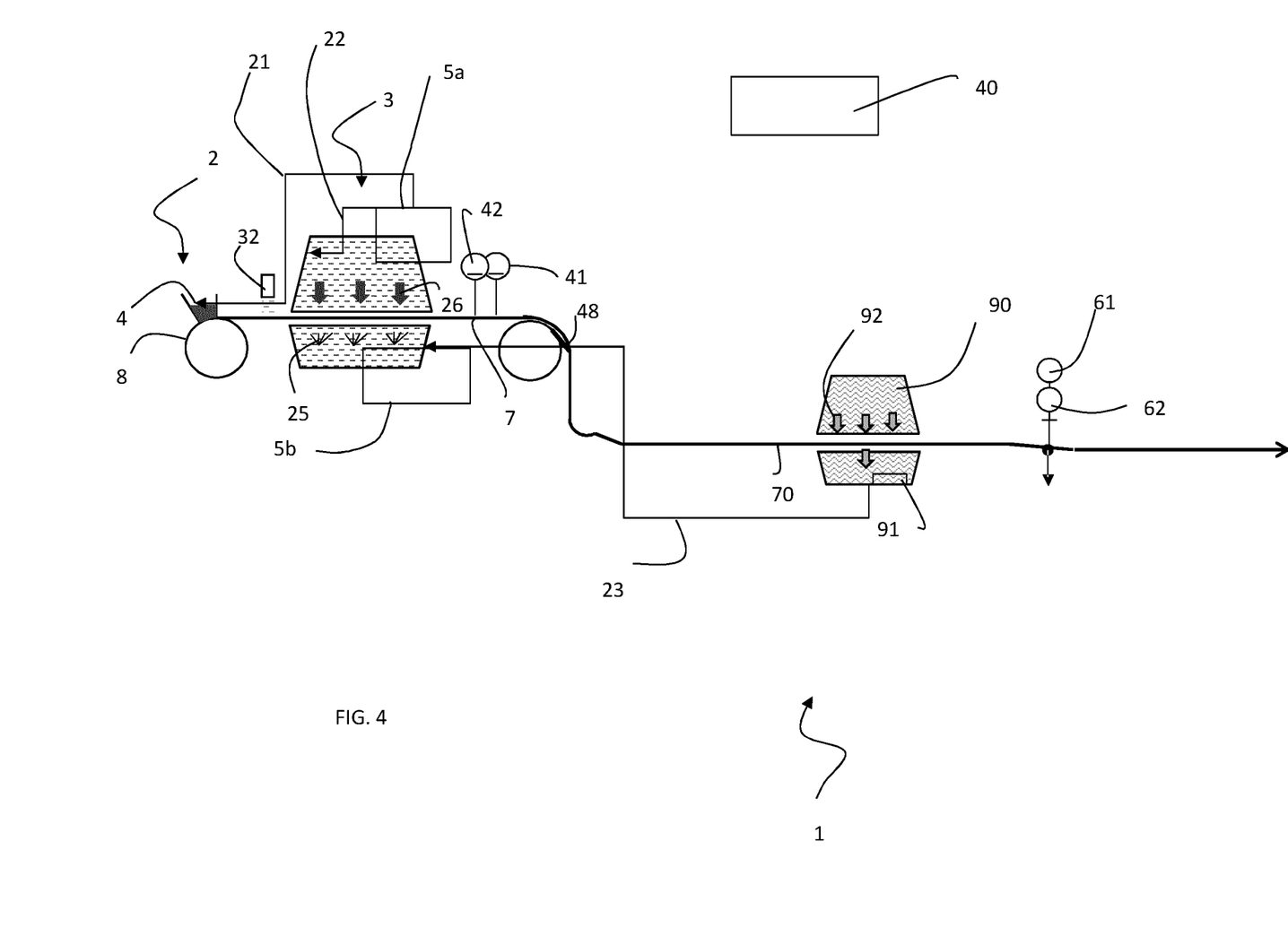
FIG. 4 is a more detailed lateral view of the apparatus of FIG. 1.

As shown in FIG. 4, the drying apparatus 3 includes a first fluid generator device and a second fluid generator device. The first fluid generator device includes a steam generator 25, located below the movable support 7, and adapted to eject steam, preferably superheated steam, towards the bottom of the movable support 7. Further, the second fluid generator device includes a drying air generator 26 adapted to eject drying air towards the cast web positioned onto the support 7 from above. The flow rate of both the steam and of the drying air is controllable and changeable. The temperature of the drying air can be modified as well.

The first and second fluid generators generate heat. This heat also generates exhausts while the sheet is dried. The exhausts are collected in first and second collecting means 5a and 5b. Second collecting means 5b is located preferably at the bottom of the drying apparatus 3. First collecting means 5a is preferably located at the top of the drying apparatus 3. The first collecting means 5a at the top collects preferably gaseous exhausts. The second collecting means 5b at the bottom preferably collects liquid exhausts, such as condensed water from the steam. Preferably first and second collecting means 5a, 5b also includes devices to extract or otherwise recover volatiles from the exhausts.

Preferably, downstream the drying apparatus 3, a doctoring blade 48 is located, to remove the cast web from the first movable support 7 at the exit of the drying apparatus 3. The cast sheet 9 from the first movable support 7 is laid onto a further second movable support 70. The drying apparatus 3 further comprises a moisture sensor 41 to measure the moisture content of the cast sheet 9. Preferably, moisture sensor 41 is located at the exit of drying apparatus 3. Drying apparatus 3 preferably also includes a thickness sensor 42 to measure the thickness of the cast sheet 9. Preferably, thickness sensor 42 is located at the exit of drying apparatus 3. The thickness value and the moisture value measured by the moisture sensor 41 and the thickness sensor 42, respectively, are sent to the control unit 40, so that, in case the moisture value or the thickness value is not within a preferred set range, one of: the flow rate of the steam, or the flow rate of the drying air or the temperature of the drying air, or combination of the above can be performed in order to have a feedback control. The flow distribution of the steam may be modified. The flow distribution of the drying air may be modified. The temperature distribution of the drying air may be modified. Also, the control unit 40 may change different parameters, such as the temperature of the casting box, the viscosity of the slurry or other process parameters.

At the exit of the drying apparatus 3, preferably, a cooling section 90 is present. The second movable support 70 moves the cast sheet 9 from the drying apparatus 3 to the cooling section 90. In the cooling section 90, the temperature of the cast sheet is reduced before winding the cast sheet into bobbins. The cooling section 90 includes a temperature control device 91. The temperature control device 91 includes a cooling air generator 92 to eject cooling air towards the cast sheet. The purpose of the cooling section is mainly to reduce the temperature of the cast sheet to facilitate winding of the sheet of material containing alkaloids.

At the exit of the cooling section 90, the apparatus 1 includes one or more sensor 61, 62, to measure the moisture of the cast sheet and the thickness of the same. The value(s) of moisture and thickness are preferably sent to the control unit 40 and appropriate feedback controls may become operative. For example, the temperature or the flow rate of the cooling air or drying air can be changed within the drying apparatus 3 or cooling section 90. Also, parameters of the slurry preparation and casting can be changed by appropriate algorithms and feedback loops.

Downstream the cooling section 90, a winding section 10 is provided (see FIG. 1), where the cast sheet 9 is wound into bobbins.

The exhausts gathered within the drying apparatus 3 at first and second collecting means 5a, 5b are then reused to heat up portions of the apparatus 1. For example, via suitable piping indicated in FIG. 4 via an arrow 21, the exhausts are channeled towards the casting box 4 to heat the slurry therein.

Alternatively or in addition, with suitable piping indicated with an arrow 22 in FIG. 4, the exhausts are transported in another location within the drying apparatus 3 to heat the cast sheet 9.

Further, also heat from the first or second movable support 7, 70 can be recovered. For example, in the cooling section 90, the cooling air ejected towards the cast sheet is warmed up by the sheet and the movable support 70. This heated up air can be collected by suitable piping, indicated with an arrow 23 in FIG. 4, and directed towards either the casting box (piping not shown), or the drying apparatus 3, or both.

Figure 3:
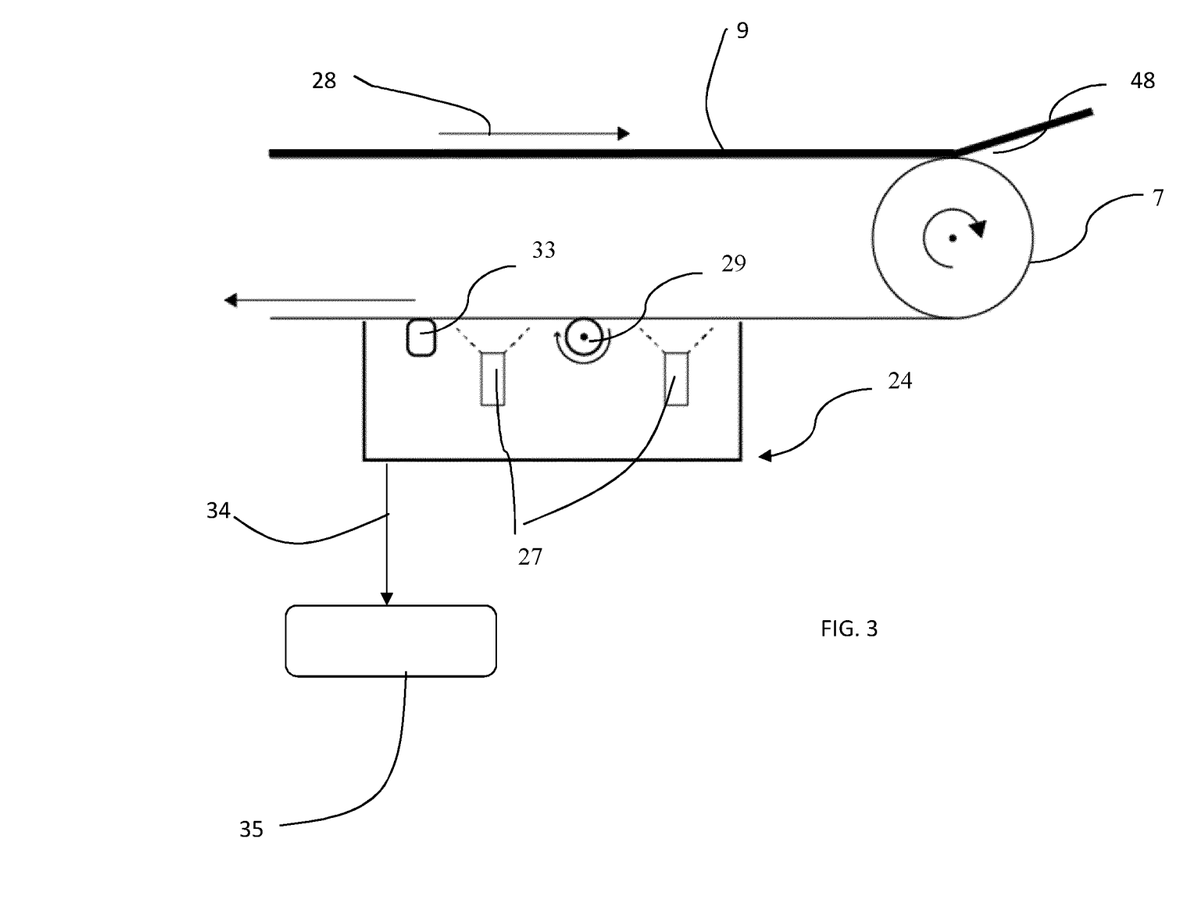
FIG. 3 is a schematic lateral view of a detail of another portion of the apparatus of FIG. 1.

Another system to recover heat from the first movable support 7 is depicted in FIG. 3. The cast sheet 9 moving along the transport direction is separated from the movable support 7 by the doctoring blade 48 as shown in FIG. 4. A control and washing system 24 is then provided upstream the doctoring blade 48 with reference to the movement of the support 7. Downstream the doctoring blade 48, the movable support forms a loop and returns towards the casting box 4.

The washing system 24 incudes preferably several units, each having a nozzle 27 adapted to direct a water jet towards the surface of the movable support 7 where the sheet 9 was present before being doctored. The water jets wash the surface of the movable support 7 removing possible residues. At the same time, the water of the jets cools the movable belt.

The control and washing system 24 also comprises a rotating brush 29 and a water scrapper 33.

The movable belt is then also preferably cleaned by the rotating brush 29. In a preferred embodiment, the rotating movement is opposite to the movable support movement in order to optimize the mechanical friction. The water scrapper 33 is preferably located downstream the nozzles 27 and brush 29 to dry the belt.

The water from the water jets is heated up due to the contact with the warm movable support 7. This water is preferably recovered using suitable piping 34 and brought to a heat exchanger 35. It can then be used to heat other parts of the apparatus 1.

Figure 5:
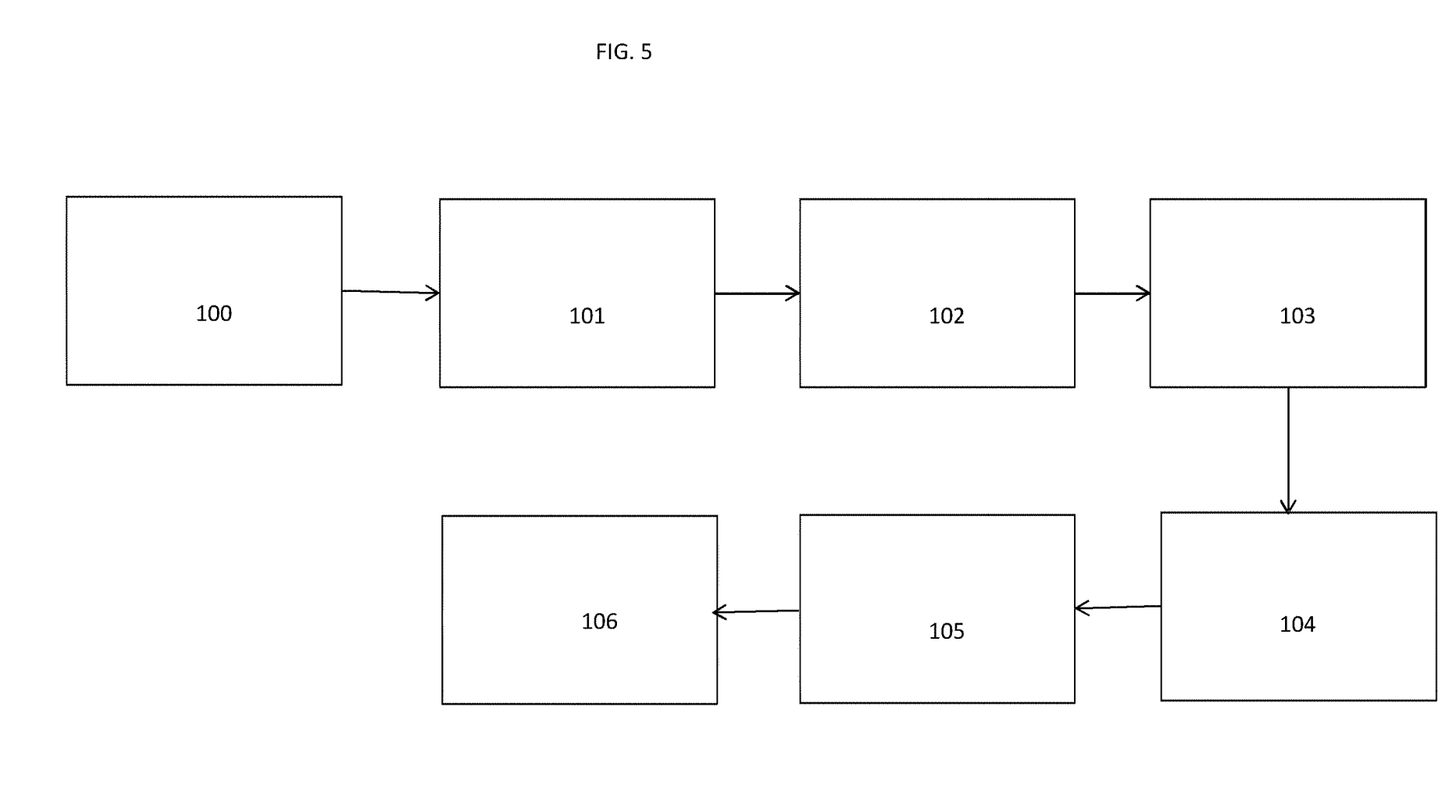
FIG. 5 is a flow diagram of a method of production of a homogenized tobacco web using the apparatus of the invention.

With now reference to FIG. 5, the functioning of the apparatus 1 including the casting apparatus 2 and drying apparatus 3 is as follows. A slurry, formed preferably by combining and mixing tobacco powder and other ingredients, is transferred from a holding tank (not shown) using for example in line mixers (also not shown) to the casting apparatus 2 inside the casting box 4. The step 100 of casting of the slurry into a web of homogenous and uniform film thickness is performed on the movable support 7, for example the stainless steel belt 7. The casting step 100 includes transferring the slurry from the mixing tank to the casting box 4. Further, the casting step 100 preferably includes at least one of: monitoring the level of slurry in the casting box 4, the moisture of the slurry inside the casting box 4, the temperature of the slurry, and the density of the slurry, by means of suitable sensors, such as sensor 30.

The casting is performed by means of casting blade 6 forming a gap with the movable support 7. The gap dimensions can also be feedback controlled. The thickness of the web of homogenized tobacco material and grammage controlled by nucleonic gauge immediately after casting may be monitored and feedback-controlled using slurry measuring device.

Further, the cast sheet 9 undergoes a drying step 101 by means of the drying apparatus 3. The drying step includes preferably a uniform and gentle drying of the cast web in an endless, stainless steel belt dryer with individually controllable zones. Preferably, the drying step comprises monitoring the cast leaf temperature at each drying zone to ensure a gentle drying profile at each drying zone and heating the support where the homogenized cast sheet is formed. Preferably, the drying profile is a so called TLC drying profile. During the drying step 101, a monitoring step 102 of the cast web temperature at each drying zone to ensure a gentle drying profile at each drying zone is preferably performed. The cast web is dried in the drying step on the movable support 7 with steam pan heating from bottom and top air drying. Every drying zone of the drying section is equipped with steam flow and pressure control that the air temperature and air flow are fully adjustable to provide the desired drying profile and ensuring product residence time is respected. Preferably, the monitoring step 102 is executed to also measure the moisture content and number of defects present in the dried web at the end of the first drying step, as well as the thickness of the cast web.

During the drying step 101, a step of heat recovery step 103 takes place, where the exhausts from the drying step 101 are collected and the heat present therein is reused within apparatus 1. A heat recovery takes place. Preferably, this heat recovery 103 includes a volatile recovery as well.

Preferably, at the end of the casting step 100, the drying step 101, and the heat recovery step 103, the homogenized tobacco web is removed from the support 7. Doctoring 104 of the cast web after the drying step at the right moisture content is preferably performed. After the doctoring step 104, a cooling step is performed 105, during which a possible additional heat recovery is performed, and then the cast web is preferably wound in one or more bobbins in a winding step 106, for example to form a single master bobbin. This master bobbin may be then used to perform the production of smaller bobbins by slitting. The smaller bobbin may then be used for the production of an aerosol-generating article (not shown).

The invention claimed is:

1. A method to produce a sheet of a material containing alkaloids, the method comprising:
    mixing particles of the material containing alkaloids, a binder, an aerosol former and water to form a slurry;
    casting the slurry to form a cast sheet;
    drying the cast sheet by means of a heated fluid;
    recovering heat from exhausts produced during drying;
    recovering volatile substances from exhausts produced during drying;
    obtaining a flavor extract from the recovered volatile substances;
    transporting the cast sheet along a transport direction during the drying;
    collecting exhausts produced in the drying step from different locations along the transport direction; and
    obtaining a different substance from each of the exhausts depending on the location of the exhaust collection.

2. The method according to claim 1, wherein the step of casting the slurry to form a cast sheet comprises:
    casting the slurry having a moisture content comprised between about 60 percent and about 80 percent.

3. The method according to claim 1, including:
    -using the recovered heat to warm up the slurry before casting.

4. The method according to claim 1, including:
    using the recovered heat to warm up the cast sheet at a given location.

5. The method according to claim 1 including:
    using the recovered heat to warm up the cast sheet in a location upstream the location in which the exhausts are recovered in the transport direction.

6. The method according to claim 1, comprising:
    casting the slurry onto a movable support; and
    recovering heat from the movable support.

7. The method according to any of the preceding claims, comprising:
    collecting water formed during the drying step; and
    recovering heat from the collected water.

8. The method according to claim 1, wherein the step of recovering volatile substances from exhausts produced in the drying step includes one or more of the following:
    condensing the exhausts;
    filtering the exhausts;
    performing a liquid-liquid separation of the exhausts; and
    distillating the exhausts.

9. The method according to claim 1, including the step of:
    using the recovered heat to separate the recovered volatile substances.

10. The method according to claim 1, wherein the step of recovering heat from exhausts produced in the drying step includes one or more of:
  recovering heat by means of a heat exchanger;
  recovering heat by means of a heat pump; and
  transporting exhausts by means of pipes.

11. The method according to claim 1, wherein the cast sheet is dried in a dryer and the step of recovering heat from exhausts produced in the drying step includes
  recovering heat from exhausts produced in an upper portion of the dryer.

12. The method according to claim 1, including the step of:
  adding the flavor extract to the slurry.

13. The method according to claim 1, wherein the cast sheet is dried in a dryer and the step of recovering heat from exhausts produced in the drying step includes one or more of:
  collecting gaseous exhausts from an upper portion of the dryer; and
  collecting liquid exhausts from a lower portion of the dryer.

\* \* \* \* \*